United States Patent

Schmidt et al.

[19]

[11] Patent Number: 6,161,904
[45] Date of Patent: Dec. 19, 2000

[54] METHOD AND DEVICE FOR CONTROLLING A BRAKING SYSTEM IN OPEN LOOP

[75] Inventors: Günther Schmidt, Tauberbischofsheim; Jürgen Binder, Stuttgart; Hermann Winner, Karlsruhe; Ulrich Gottwick, Stuttgart, all of Germany

[73] Assignee: Robert Bosch GmbH, Stuttgart, Germany

[21] Appl. No.: 09/253,425

[22] Filed: Feb. 19, 1999

[30] Foreign Application Priority Data

Feb. 21, 1998 [DE] Germany .............................. 198 07 369

[51] Int. Cl.⁷ ........................................................ B60T 8/88
[52] U.S. Cl. ................................. 303/122.09; 303/122.04
[58] Field of Search ............................... 303/122, 122.01, 303/122.02, 122.03, 122.04, 122.05, 122.08, 122.09, 122.1, 122.11, 122.12, 122.13, 122.14, 15

[56] References Cited

U.S. PATENT DOCUMENTS

| | | | |
|---|---|---|---|
| 5,201,573 | 4/1993 | Leiber et al. | 303/92 |
| 5,707,117 | 1/1998 | Hu et al. | 303/122.08 |
| 5,752,748 | 5/1998 | Schramm et al. | 303/122.03 |
| 6,003,961 | 5/1998 | Binder et al. | 303/122 |

FOREIGN PATENT DOCUMENTS

| | | |
|---|---|---|
| 0 386 953 | 9/1990 | European Pat. Off. . |
| 197 32 884 | 2/1998 | Germany . |
| WO97/32766 | 9/1997 | WIPO . |

OTHER PUBLICATIONS

Jonner et al., "Electrohydraulic Brake System—The First Approach to Brake–By–Wire Technology," SAE (Society of Automotive Engineers) Technical Paper Series, Paper No. 960991, International Congress & Exposition, Detroit, Michigan, Feb. 26–29, 1996, pp. 105–112.

*Primary Examiner*—Michael Mar
*Assistant Examiner*—Devon Kramer
*Attorney, Agent, or Firm*—Kenyon & Kenyon

[57] ABSTRACT

A method and a device for controlling a braking system of a motor vehicle in open loop, in which a driver's braking input is converted into setpoint wheel-brake pressures for the individual wheel brakes, and the wheel-brake pressure is adjusted to the setpoint wheel-brake pressure in view of the measured wheel-brake pressure. Various secondary braking operations are initiated as a function of the type of fault. In response to a serious fault such as failure of the electrical energy supply, of the pressure supply, or an electrical fault in the control unit of the braking system, the valve arrangements controlling the wheel-brake pressures are switched over into a currentless state, and in response to a fault in detecting the driver's braking input, only the valve arrangements allocated to the front axle are switched into a currentless state. Furthermore, in response to a fault affecting the ability to build up or reduce pressure at only one wheel, an electrical open-loop control is implemented at only three wheel brakes, and in response to a fault which affects the ability to build up or reduce pressure at only one wheel of an axle without impairing the ability to build up and reduce pressure at this wheel, a shared control of one axle is carried out within the framework of a closed pressure-control loop.

11 Claims, 3 Drawing Sheets

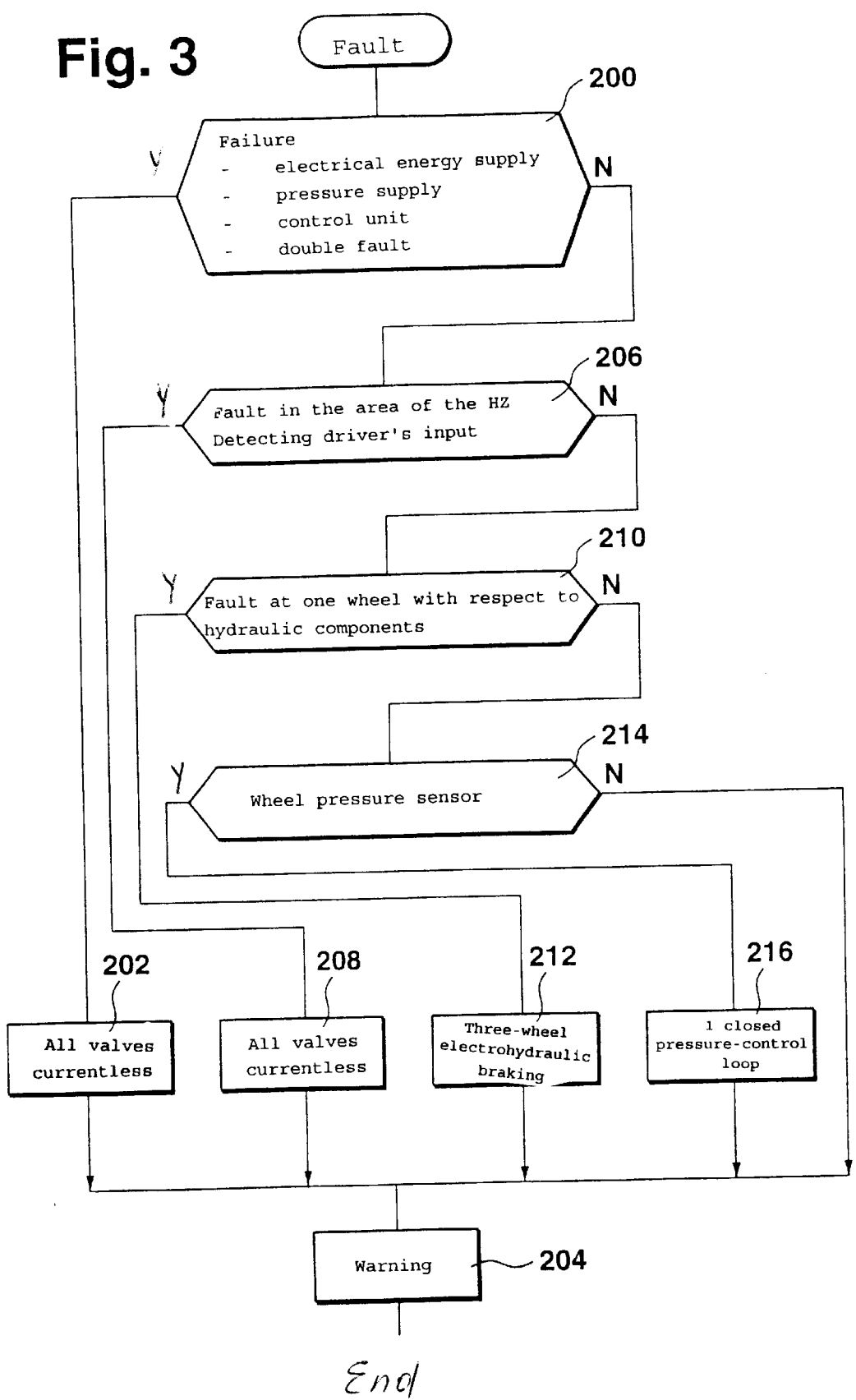

METHOD AND DEVICE FOR CONTROLLING A BRAKING SYSTEM IN OPEN LOOP

FIELD OF THE INVENTION

The present invention relates to a method and a device for controlling a braking system in open loop.

BACKGROUND INFORMATION

Jonner et al., "Electrohydraulic Brake System—The First Approach to Brake-By-Wire Technology," SAE (Society of Automotive Engineers) Technical Paper Series, Paper No. 960991, 1996, pp. 105–112 describes a conventional electrohydraulic braking system, in which a driver braking input is derived from the actuation of the brake pedal by the driver. This braking input is converted, possibly in view of further operating variables, into setpoint brake pressures for the individual wheel brakes. The setpoint braking pressures are adjusted for each wheel by closed pressure-control loops as a function of the predefined setpoint pressure, and of the actual brake pressure measured in the area of the wheel brake. Since, in such an electrohydraulic braking system, the brake pressure in the wheel brakes is adjusted and modulated by electrical means via valve arrangements, dependent upon the driver's braking input, in case of a fault, secondary braking operations must be guaranteed which assure a sufficient braking action, even in the event of a fault. The proposal in this connection for the conventional braking system is switching off the electrical system and switching over to a hydraulic brake, or the electrical operation of only three wheel brakes. With these means, most faults can be satisfactorily mastered, though nevertheless, in some cases, a switch-over is made to hydraulic operation.

SUMMARY OF THE INVENTION

An object of the present invention is to provide secondary braking operations of an electrically controlled braking system which, in case of a fault, permit having to switch over as little as possible to a direct mechanical influence of the driver on the wheel brakes.

An emergency-operation system of an electrically controlled braking system is provided, in which various secondary braking operations are initiated, depending on the fault case. In an advantageous manner, a complete shut-down of the electrical control system is necessary only in the case of a few serious faults.

Because of this, the availability of the electrical control system is improved, without endangering the operational safety.

It is especially advantageous that, even in case of a fault, an improved braking action is attained compared to a complete shut-down of the electrical control system; in particular, a braking boost operation takes place.

In addition to the 3-wheel Electrohydraulic Braking ("EHB")-operation described above, available as secondary braking operations are a closed-loop control, in which the wheel brakes of one axle are controlled together, and a switching-off of the electrical open-loop control at one axle, while continuing electrical control at another. Thus, the number of secondary braking operations is increased, and the braking performance is considerably improved in case of fault.

BRIEF DESCRIPTION OF THE DRAWINGS

FIG. 3 shows a flow chart illustrating a preferred implementation of the emergency operations of an electrohydraulic braking system as a program of a microcomputer.

DETAILED DESCRIPTION

Figure 1:
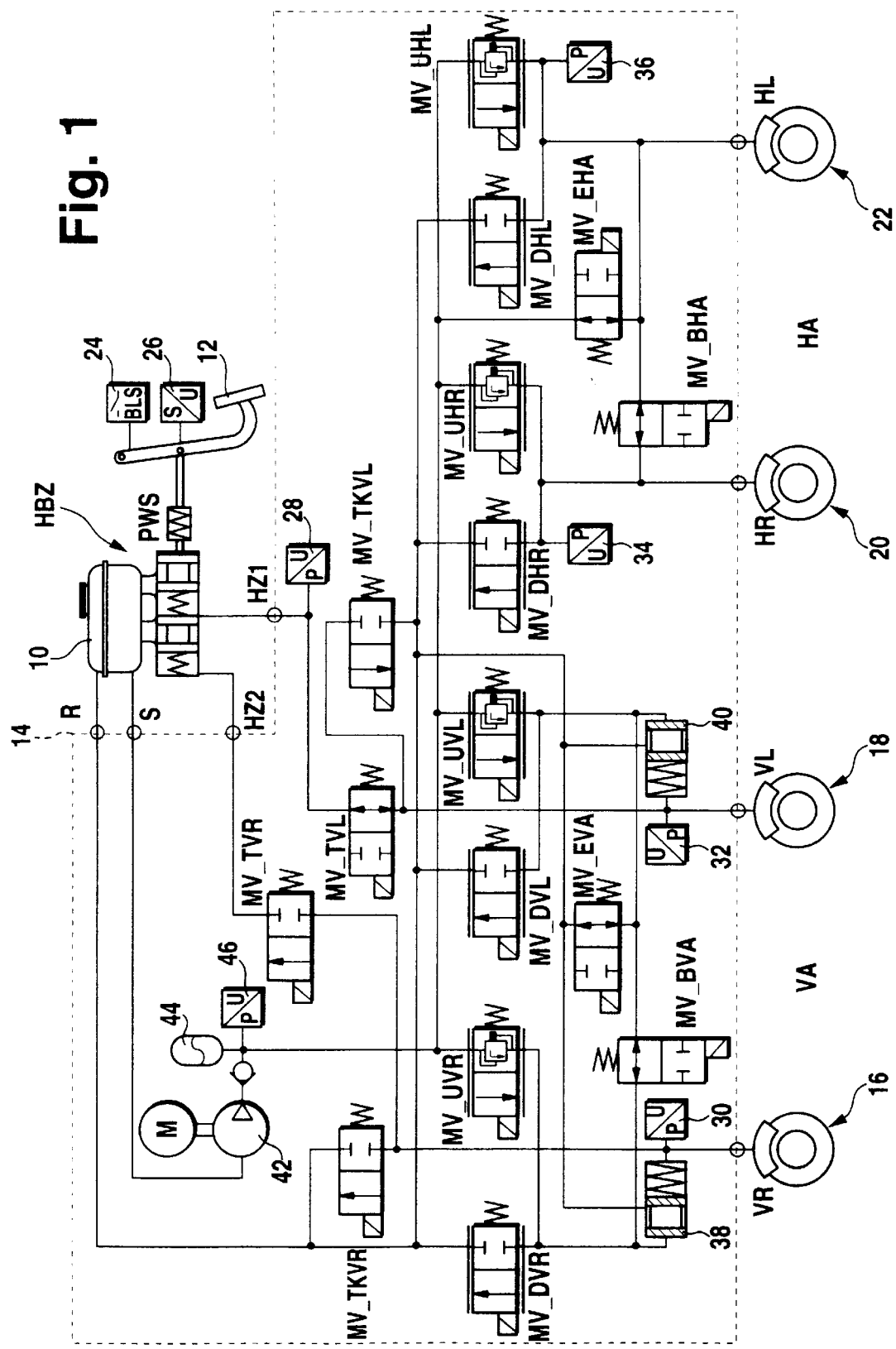
FIG. 1 shows a preferred exemplary embodiment of an electrohydraulic braking system.

FIG. 1 shows a preferred exemplary embodiment of an electrohydraulic braking system. It depicts a master brake cylinder HBZ having a reservoir 10, to which a brake pedal is attached, operable by the driver. In addition, provision is made for a hydraulic aggregate (e.g., hydraulic modulator) 14 which includes valve and pump arrangements for controlling wheel brakes 16, 18, 20 and 22. Connected to brake pedal 12 is a brake-pedal switch 24 which closes in response to the actuation of the brake pedal, and a measuring device 26 for detecting the deflection of the brake pedal. The brake-pedal switch can be designed as a simple make-contact element, or, to improve the monitoring ability, as a double switch having a break-contact element and a make-contact element. In the same way, measuring device 26 for detecting the deflection of the pedal can be redundantly designed. In addition, provision is made for a pedal-travel simulator PWS, which simulates a counteracting force for the driver in response to actuation of the brake pedal.

Connected to master brake cylinder HBZ are the two brake circuits HZ1 and HZ2. Inserted in them are a separating block valve MV_TVR and MV_TVL, respectively, which, in an electrically controlled braking system, are closed by receiving current. Upstream of the separating valve, in at least one of the brake circuits, a pressure sensor 28 measures the pressure applied by the driver via the brake-pedal actuation. When the separating valves are closed, the master brake cylinder is hydraulically separated from the pressure-regulating system. One pressure modulator for regulating braking pressure is included for each wheel brake in the pressure-regulating system. Each pressure modulator is composed of one intake valve (MV_UVR, MV_UVL, MV_UHR, MV_UHL), one discharge valve (MV_DVR, MV_DVL, MV_DHR, MV_DHL) and one pressure sensor 30, 32, 34 and 36 which measures the pressure in the line leading to the wheel brake. One media-isolating piston 38 and 40, respectively, is located in the two front-wheel pressure modulators, between the valves (intake and outlet valve) and the pressure sensors or the wheel brake. The pressure modulators are connected via equalizing balance valves MV_BVA and MV_BHA which, in response to receiving current, can be controlled independently of one another.

Also provided for each axle are relief valves MV_EVA and MV_EHA, respectively, which, when not receiving current, permit the reduction in pressure from the wheel pressure-modulators of one axle. They connect the pressure modulators of one axle to the feedback lines running to reservoir 10. In the electrically controlled operating state, these two valves are permanently current-receiving, i.e. closed.

Provision is furthermore made in each case for a temperature-compensation valve MV_TKVL and MV_TKVR for each front-wheel pressure modulator. These valves are closed, in a state of receiving no current, and are opened, by receiving current, for reducing pressure from the pressure modulator of one front wheel when certain conditions, in particular a very long braking duration, exist. The temperature-compensation valves connect the brake line to the wheel brake, with the return line. The energy for the brake-pressure modulation comes from a single-piston high-pressure pump 42 driven by an electromotor. High-pressure pump 42 is connected to a high-pressure accumulator 44, which is used as an intermediate buffer, and whose pressure is detected by a pressure sensor 46. The pressure line of pump 42 runs to the intake valves of the wheel brakes, while the suction line of pump 42 is connected to reservoir 10. Reference is made to the preferred exemplary embodiment shown in FIG. 1 with regard to particulars of the hydraulic circuitry. Relief valves MV_EVx and temperature-compensation valves MV_TKx are omitted in one exemplary embodiment.

However, the procedure of the present invention, described in the following, is advantageously used not only in conjunction with such a hydraulic circuit, but rather everywhere, where secondary braking operations must be established in the event of a fault in an electrically controlled braking system.

During normal operation, the braking system described in FIG. 1 functions as follows. The driver steps on the brake pedal. In so doing, he feels a counteracting force dependent on the pedal travel. This travel-dependency is formed by the defined characteristic property of the pedal-travel simulator. In response to sensing a driver's braking input via the pedal-travel sensor, the brake-pedal switch and/or the pressure sensor, separating valves (MV_TVR and MV_TVL) and relief valves (MV_EVA and MV_EHA) are closed. A pressure resulting from the pedal force builds up in master brake cylinder HBZ. The braking command of the driver is calculated from the signals of brake-pedal switch 24, travel sensor 26 and/or pressure sensor 28 as, e.g., a setpoint retardation (e.g., deceleration) or as a setpoint braking force. The individual setpoint wheel-brake pressures are formed from this braking command. These pressures are modified depending on the driving condition and slippage condition and are adjusted via the wheel pressure modulators due to current flowing through the valves.

In the closed control loop, the prevailing pressures at the wheel pressure sensors are retrieved for the setpoint-actual adjustment for each wheel brake. In response to different setpoint pressures in the left and right wheel of an axle, the equalizing valves are closed, and in each wheel brake, the predefined setpoint pressure is adjusted by driving the intake and discharge valves along the lines of a closed-loop control of the actual brake pressure to the setpoint brake pressure. To build up pressure at a wheel brake, the intake valve is traversed by current to the extent that the desired setpoint pressure develops in the wheel brake, producing the desired dynamic response. Pressure is decreased in a corresponding manner by current flowing through the discharge valves, brake fluid flowing back into the reservoir via the return line. The relief valves come into effect in case of a fault in the system. If, during a braking operation, the electrical system fails, all the valves revert to their state of receiving no current. The relief valves then open the pressure modulators to the return line, so that no braking pressure can be locked in. In the same way, in the quiescent state, these valves permit the compensatory volume flow to the reservoir in response to temperature fluctuations.

Pump 42 is actuated in response to an active braking process and/or, in the event the accumulator pressure in accumulator 44 falls below a predefined value. In addition to this function, ascertained accumulator pressure 46 is also evaluated within the framework of the closed-loop control, since it essentially represents the pressure present at the entry of the intake valves.

Figure 2:
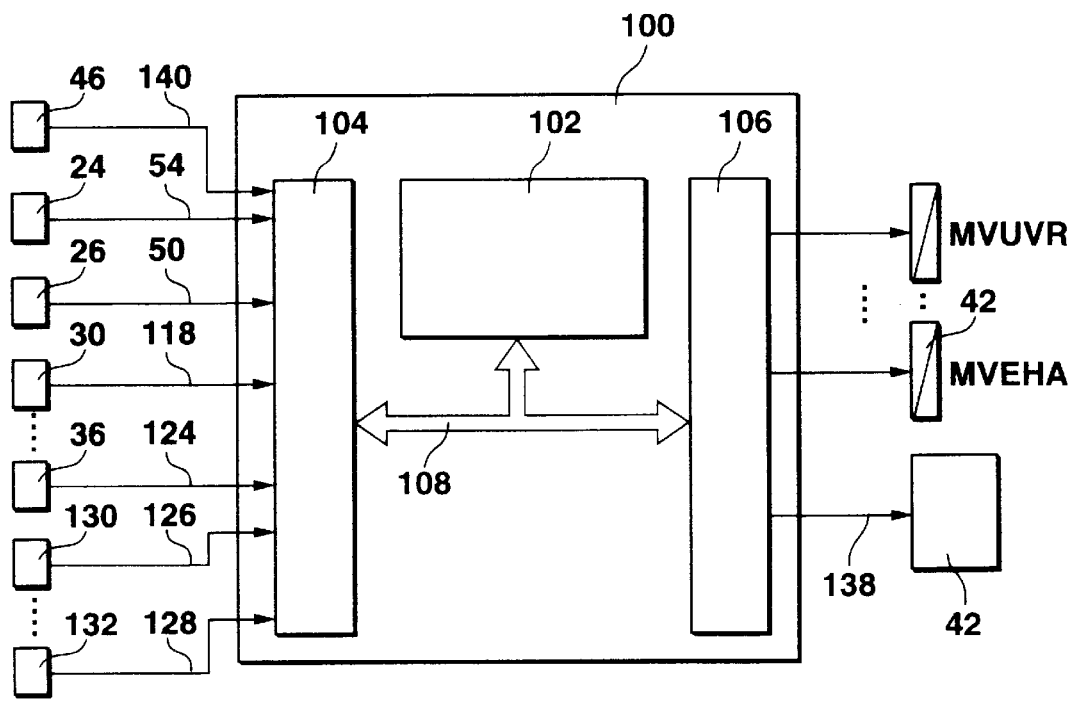
FIG. 2 shows a control unit controlling the electrohydraulic braking system.

The electrically operable valves and pump 42 are driven by at least one electronic control unit, sketched in FIG. 2. It includes at least one microcomputer 102, one input circuit 104, one output circuit 106, and a bus system 108 linking these elements for mutual data exchange. Lines 50 and 54 run from brake-pedal switch 24 and pedal-travel sensor 26 to input circuit 104. In addition, input lines 118 through 124 connect input circuit 104 to sensors 30 through 36 allocated to each wheel brake. Provision is furthermore made for an input line 140 which runs from measuring device 46 for detecting the accumulator pressure to input circuit 104. Further input lines 126 through 128 connect input circuit 104 to measuring devices 130 through 132 for detecting further operating variables of the braking system, of the vehicle and/or of its drive unit. Such operating variables are, e.g., the wheel velocities, possibly the motor torque supplied by the drive unit, axle loads, the pressure in the brake line (sensor 28), etc. A plurality of output lines are connected to output circuit 106. Shown, for example, are the output lines, via which the valves of the pressure modulators are actuated. Pump 42 is driven via a further output line 138. Control unit 100 controls the braking system as a function of the supplied signal variables, along the lines presented above.

FIG. 3 shows a preferred exemplary embodiment for secondary braking operations and their selection in an electrohydraulic braking system. The sketched program runs in response to at least one detected fault, for as long as the fault monitoring is active, i.e. when the electric braking control is not completely switched off. The fault monitoring itself, i.e. ascertaining the type of fault, is carried out in other programs not specially specified here.

After the start of the program in response to at least one detected fault, a check is made in first step 200 as to whether a failure of the electrical energy supply, of the hydraulic pressure supply, an internal fault of the control unit, or a double fault, i.e. at least one fault each at different axles, is present. The failure of the electrical energy supply is detected, e.g., by monitoring the battery voltage and/or the generator current, the failure of the pressure supply is detected, e.g., by monitoring with respect to limiting values of the accumulator pressure and/or of the accumulator-pressure gradients. Internal faults of the control unit are ascertained by customary monitoring of the components, such as by using a watchdog, electronic memory test, potential monitoring, etc.

If one of these faults has been ascertained, according to step 202, all valves are switched over to the currentless state. Under no circumstances can the electric control system be maintained any longer. Within the framework of this secondary braking operation, the pressure build-up is applied by the driver through muscular energy via the master brake cylinder to the front axle, without braking-force assistance. The rear axle remains unbraked. Thereupon a warning is output to the driver (step 204), e.g. via a warning light which informs the driver about the fault and/or the secondary braking operation, and the program concludes. Since the electric control system is switched off, the secondary braking operation is retained at least until the next start of an operating cycle; the program will no longer run through.

If none of the faults described in step 200 are present, a check is made in step 206 as to whether a fault exists in detecting the driver's input, e.g., a failure of a sensor, a fault in the pedal-travel simulator, etc. These faults, primarily sensor failures, are ascertained, e.g., by comparing the sensor signals to one another and, optionally, to a further sensor signal, or by checking the signal of the respective sensor solely for limiting values.

If such a fault is detected, according to step 208, a secondary braking operation is initiated which results in switching the valves of the front axle to a currentless state. Because of this, as above, the pressure build-up must be applied to the front axle by the driver. If the defective sensor can be ascertained, the rear axle continues to be retained in electrically controlled operation, the fault-free sensor signal being retrieved for forming the driver's braking input. In this case, the wheel pressure sensors of the front-axle brake are used for monitoring the electrical control system, in that their signals are compared to the driver input. In the event of unacceptable deviations, a double fault is present, which then leads to a secondary braking operation according to step 202.

If there is no fault in detecting the driver input, in step 210, it is checked whether a fault exists at a component of the hydraulic aggregate. Extensive fault checks are provided for its discovery. Thus, for example, outside of a braking operation, for each wheel, the deviation between measured braking pressure and setpoint pressure is compared to a permissible deviation.

Moreover, if an unacceptable accumulator-pressure change is ascertained, a substantially leaky or open intake valve can be isolated as the defective component. If no unacceptable change can be detected in the accumulator pressure, this points to a non-opening separating valve, a non-opening temperature-compensation valve or a blocked line; in the case of the rear-axle brakes, it is detected by a non-opening relief valve or balance valve, or a blocked line. Given the presence of a pressure build-up phase, in the event of an unacceptable deviation of the actual pressure from the setpoint pressure, and simultaneously too great a build-up time and unacceptable accumulator-pressure drop, then a leaky discharge valve, or a leakage in the area of the braking system between the accumulator and the media isolator is detected. If at least one of the two last conditions is not present, e.g., a non-opening intake valve is assumed.

Given a pressure reduction, it is checked whether driving time T exceeds a maximum pressure-reduction driving time, and the accumulator-pressure gradient is examined. If the reduction time exceeds the maximum time, and the accumulator-pressure gradient is unacceptably large, a non-closing intake valve is assumed. If one of the conditions is not satisfied, and the wheel-brake actual pressure and wheel-brake setpoint pressure deviate unacceptably from one another, a non-opening discharge valve, a hanging media isolator and/or a nonopening temperature-compensation valve are considered as the cause.

If one of these faults is present, according to step 212, a "3-wheel EHB operation" is initiated as secondary braking operation by closing the balance valve of the front axle, so that no more pressure is built up at the wheel of the front axle at which the fault has occurred. Since a wheel-individual closed-loop control is no longer possible at this wheel, wheel-individual functions (e.g., operating-dynamics control) are switched off; however, the anti-lock protective function can remain active for the remaining three wheels. The currentlessly closed pressure-reduction valve of the isolated wheel is driven briefly at regular timed intervals to ensure a disengaged brake. To avoid a strong build-up in yawing moment, a yawing-moment restriction, whose functioning method in principle is known from the related art, is advantageous.

If none of the faults was ascertained according to step 210, a check is made in step 214 as to whether one wheel pressure sensor is obviously defective. This can be effected on the basis of a hard-ware check test (e.g. measuring the internal resistance, etc.).

In this case, according to step 216, a control of one axle within the framework of a closed pressure-control loop is initiated as the secondary braking operation. To that end, the balance valve of the axle of the wheel at which the fault has occurred is opened, and in both wheel brakes of this axle, the pressure is regulated in accordance with the setpoint value and the actual value of the wheel to which the correctly functioning wheel pressure sensor is allocated. Wheel-individual functions must be switched off here as well, it optionally being possible for the ABS (anti-lock) function to continue to be active for the other axle not affected by the secondary braking operation.

If the fault checked in step 214 is also not present, as after steps 202, 208, 212, 216, the driver is warned, though without restriction, or only comfort restrictions such as a firmer or softer pedal. For example, this is the case when, because of the change in the accumulator pressure, in response to pressure build-up in the wheels, air was detected in one or more wheel calliper.

In one advantageous embodiment, braking via muscular-energy operation is carried out at one wheel, and electrical closed-loop control is implemented at the remaining three wheels as the secondary braking operation. This is carried out primarily when a media isolator cannot be moved. The wheel to which this media isolator is allocated is controlled by the driver via the master cylinder, the remaining three wheels are still controlled in electrohydraulic operation.

The secondary braking operations described are also used in conjunction with fault-detection measures which differ from those elucidated above.

It is essential, in response to a serious fault such as a failure of the electrical energy supply, of the pressure supply, or an electrical fault of the control unit controlling the brakes, that the valve arrangements controlling the wheel-brake pressures are switched over into a currentless state, that in response to a fault in detecting the driver's braking input, only the valve arrangements allocated to the front axle are switched into a currentless state, that in response to a fault affecting the ability to build up or reduce pressure at only one wheel (e.g. fault in a valve arrangement), an electrical open-loop control is implemented at only three wheel brakes, and that in response to a fault which affects only one wheel of an axle without impairing the ability to build up and reduce pressure at this wheel, (e.g., a pressure-sensor fault), a shared control of one axle is carried out within the framework of a closed pressure-control loop.

What is claimed is:

1. A method for controlling a braking system of a motor vehicle, comprising the steps of:

converting a braking input of a driver into a setpoint wheel-brake pressure for each wheel brake of the motor vehicle;

adjusting a wheel-brake pressure for each wheel brake to the setpoint wheel-brake pressure in accordance with a measured wheel-brake pressure; and initiating secondary braking operations as a function of a type of a fault, wherein the initiating step includes performing the steps of:

switching over at least one valve arrangement into a currentless state in response to a first fault, the at least one valve arrangement controlling the wheel-brake pressure, switching over at least one front valve arrangement only of the at least one valve arrangement into the currentless state in response to a second fault detected in the braking input, the at least one front valve arrangement being situated at a front axle of the motor vehicle, controlling only three wheel brakes in response to a third fault, the third fault affecting an ability of the braking system to change a pressure at only one wheel, and implementing a shared control of an axle of the motor vehicle within a framework of a closed loop control in response to a fourth fault, the fourth fault affecting only one further wheel of the axle without impairing an ability of the braking system to change a further pressure at the one further wheel.

2. The method according to claim 1, wherein the first fault includes one of a failure of an electrical energy supply, a failure of a pressure supply and an electrical fault of a control unit which controls each wheel brake.

3. The method according to claim 1, wherein the initiating step further includes the steps of:

applying the wheel brake pressure at a predetermined wheel using a muscular-energy operation; and implementing the closed loop control at three other of the wheels.

4. The method according to claim 1, wherein the third fault includes a fault in an area of a particular valve arrangement of a hydraulic aggregate.

5. The method according to claim 1, wherein the fourth fault includes a pressure-sensor fault.

6. The method according to claim 1, wherein the initiating step further includes the step of:

if a predetermined axle is controlled using the closed loop control, opening a balance valve corresponding to the predetermined axle.

7. The method according to claim 1, wherein the initiating step further includes the step of:

if particular three wheels are electronically controlled, switching off functions of a first axle of the particular three wheels and retaining at least an anti-lock brake function at a second axle.

8. The method according to claim 1, further comprising the step of:

when each of the at least one valve arrangement is in the currentless state, unbraking a rear axle.

9. The method according to claim 1, further comprising the step of:

when only the at least one front valve arrangement is in the currentless state, electronically controlling further wheel breaks of a rear axle using the closed loop control.

10. A device for controlling a braking system of a motor vehicle, comprising:

a control unit converting a braking input of a driver into a setpoint wheel-brake pressure for each wheel brake of the motor vehicle and adjusting a wheel-brake pressure of each wheel brake to the setpoint wheel-brake pressure in accordance with a measured wheel-brake pressure, the control unit including an arrangement initiating secondary braking operations as a function of a type of a fault, wherein the secondary braking operations include:

switching over at least one valve arrangement into a currentless state in response to a first fault, the at least one valve arrangement controlling the wheel-brake pressure, switching over at least one front valve arrangement only of the at least one valve arrangement into the currentless state in response to a second fault detected in the braking input, the at least one front valve arrangement being situated at a front axle of the motor vehicle, controlling only three wheel brakes in response to a third fault, the third fault affecting an ability of the braking system to change a pressure at only one wheel, and implementing a shared control of an axle of the motor vehicle within a framework of a closed loop control in response to a fourth fault, the fourth fault affecting only one further wheel of the axle without impairing an ability of the braking system to change a further pressure at the one further wheel.

11. The device according to claim 10, wherein the first fault includes one of a failure of an electrical energy supply, a failure of a pressure supply and an electrical fault in a control device of the braking system.

* * * * *